(12) United States Patent
Chapman et al.

(10) Patent No.: US 11,039,704 B1
(45) Date of Patent: Jun. 22, 2021

(54) FOLDABLE CUP HOLDER

(71) Applicants: Dana Chapman, Bloomingdale, NJ (US); Steve Shattls, Bloomingdale, NJ (US)

(72) Inventors: Dana Chapman, Bloomingdale, NJ (US); Steve Shattls, Bloomingdale, NJ (US)

( * ) Notice: Subject to any disclaimer, the term of this patent is extended or adjusted under 35 U.S.C. 154(b) by 0 days.

(21) Appl. No.: 16/842,846

(22) Filed: Apr. 8, 2020

(51) Int. Cl.
*A47G 23/00* (2006.01)
*A47G 23/02* (2006.01)

(52) U.S. Cl.
CPC ................................ *A47G 23/0225* (2013.01)

(58) Field of Classification Search
None
See application file for complete search history.

(56) References Cited

U.S. PATENT DOCUMENTS

| | | | |
|---|---|---|---|
| 1,915,958 A * | 6/1933 | Skirrow | B60N 3/007 248/300 |
| D226,623 S | 4/1973 | Shuford | |
| 4,721,216 A | 1/1988 | Kinder | |
| 4,893,773 A * | 1/1990 | Fujimoto | B60N 3/103 248/215 |
| 6,666,149 B1 * | 12/2003 | Lathrop | B60N 3/004 108/152 |
| 6,766,912 B1 | 7/2004 | Gibbs | |
| 7,284,737 B2 | 10/2007 | Kane | |
| 8,371,472 B2 | 2/2013 | Skopis | |
| 8,608,019 B2 | 12/2013 | Wren | |
| 9,382,058 B2 | 7/2016 | Konkin | |
| 9,938,012 B1 * | 4/2018 | Kollias | B64D 11/0636 |
| 2001/0013568 A1 * | 8/2001 | Berenguer | A45F 5/02 248/311.2 |
| 2005/0082455 A1 | 4/2005 | Jones | |
| 2012/0086245 A1 | 4/2012 | Nelson et al. | |
| 2013/0026336 A1 * | 1/2013 | Beckey | A47G 23/0216 248/692 |
| 2013/0043261 A1 | 2/2013 | Barton | |
| 2014/0038804 A1 | 2/2014 | Konkin | |
| 2014/0361025 A1 | 12/2014 | Rodolfo et al. | |

FOREIGN PATENT DOCUMENTS

| | | | | |
|---|---|---|---|---|
| DE | 202017101107 U1 | 7/2018 | | |
| WO | WO-0071384 A1 * | 11/2000 | | B60N 3/004 |
| WO | WO-03033298 A1 * | 4/2003 | | B60N 3/103 |

* cited by examiner

*Primary Examiner* — Steven M Marsh
(74) *Attorney, Agent, or Firm* — Michael J. Feigin, Esq.; Feigin and Fridman LLC

(57) ABSTRACT

A single continuous length of bendable material is fixedly connected to a cup holder. The cup holder is foldable flat with a plurality of pre-bent or creased regions. The cup holder and/or length of material can fold flat onto each other and the length of material has a bent configuration, aided by the creases, which forms a triangular region and a fold over itself to form a resilient holder of a cup which a straight flat longest end which fits into a seat pocket or the like. This bent configuration can be formed with five flat sides and four bends. The first and fourth bend are adjacent to each other in the folded condition and the triangular region is formed between a first, second, and third bend with the fourth bend meeting the first bend.

16 Claims, 10 Drawing Sheets

FOLDABLE CUP HOLDER

FIELD OF THE DISCLOSED TECHNOLOGY

The disclosed technology relates generally to a cup holder, and more specifically to a cup holder which is bendable and flat foldable.

BACKGROUND

Having a cup in a vehicle, such as a car or even a plane tends to create a difficulty in terms of where one places the cup. While, in some cases, there are cup holders available, these may require a tray table to be extended. In other cases, there simply aren't cup holders available at all such as in a back seat of most cars. Further, portable cup sleeves are often used for insertion of a cup, such as especially one with a hot liquid. Such devices can add bulk which makes it harder to fit the cup into a cup holder.

Thus, there is a need to be able to hold cups more securely and easily in many places. This and other problems are solved by embodiments of the disclosed technology, as described below.

SUMMARY OF THE DISCLOSED TECHNOLOGY

A cup holder of embodiments of the disclosed technology is disposable and flattenable as well as a length of material to which it is connected. The cup holder itself can be circular (having a plurality of equal cross sections) or conical (having a plurality of decreasing cross sections) while having an opening at a top and bottom. The cup holder can be flattened causing it to be wider than the length of material and the circular or conical sections to be flattened, the cup holder now being substantially two parallel and connected halves.

The length of material is fixedly attached to the cup holder along a side of the cup holder. That is, the length of material is attached tangential or along a length of the cup holder which extends from the top to bottom side (between the openings) thereof. For purposes of this disclosure, directional indicators are relative to a typical use of the device with respect to a direction of the pull of gravity. Or, the directional indicators can be understood as being relative to each other wherein "top" or "upper" is opposite "bottom" or "lower" and so forth.

The length of material has two ends, referred to in some cases as "extreme ends" which terminate the length of material along it's longest length. The longest length is a length which, when/if the material were laid flat, would extend between the extreme ends and/or be a longest linear direction along the length of material.

The length of material is foldable along four fold lines forming a four layered region with a first longest layer at a first extreme end of the length of material, a second layer at a second extreme end of the length of material, the second extreme end at an opposite end relative the first extreme end, a third layer in parallel with the first and second layer (in some configurations thereof), and a fourth layer fixedly attached to a cup holder. The first and fourth layers can wrap around the second and third layers.

An interior space is formable between the third and fourth layers causing a bottom side between the third and fourth sides to be perpendicular to a longest length of the first longest layer. The interior space and the bottom side are substantially unformed (un-created/destroyed) when the first longest layer and the cup holder are pushed towards each other. This can be when the longest layer and the cup holder are pushed towards each other. Further, this can cause the first longest layer and the fourth layer to become closer to being parallel compared to a condition before the pushing.

Described further, the single length of linear material is bendable material sometimes provided with pre-bent or creased sections. A middle linear region is fixedly and tangentially connected to a cup holder, e.g. a plurality of circular cross sections (equal or decreasing/increasing in circumference from top to bottom). The single length of bendable material is bent such that an upper portion above the first linear region is bent over a lower portion below the middle linear region. A lower portion has, in embodiments, a bottom linear region terminating at two bends. These two bends can include a first bend at a first end which is continuous with the middle linear region and a second bend at an opposite end from the first bend.

The lower portion further has, in embodiments of the disclosed technology, an interior section with two sections substantially parallel to each other with a bend between the two sections, a longer section of the two sections continuous with the second bend of the bottom linear region, and a short section of the two sections disposed further from the holder than the longer section.

The upper portion can have a single curvilinear bend being continuous with the middle linear region. That is, this is the only bend, in some embodiments, in the upper portion. This upper portion can extend to a highest and lowest extent of the portable cup holder.

The bendable material is folded over itself three times, in embodiments of the disclosed technology, forming a substantially triangular inner region with a first side being the middle linear region, a second side between the middle linear region and a third side which is continuous with said second side. This triangular region is, in embodiments of the disclosed technology, substantially an isosceles triangle with three acute angle and the first and third sides being longest and substantially equal.

A slot is formed between the third side of the triangle and a linear section at an extreme end of the single length of bendable material which is connected to the third side of the triangle. This slot is divided from (made separate from) the third side of the triangle by a bend in the single length of bendable material. The portal cup holder can be attached to a seat pocket by placing a top end of the seat pocket in the slot.

The length of material described above can have two substantially parallel sections on either side of a first bend and a triangular section between the first bend and a fourth bend, this triangular section having a second and third bend. A longest section is formed in such embodiments between the fourth bend and an end of the length of material. These bends are in numbered order along the length of material in this embodiment. Unbending the third bend causes the device to be more flattenable (able to be pushed together with less force) when pushing the longest section and the foldable conical section towards each other. In a flattened condition of the length of material and foldable conical section, the foldable conical section becomes wider than the width of the length of material (the "width" being perpendicular to the length thereof.

The foldable conical section is flattenable and in a flattened condition thereof the foldable conical section is wider than the length of material. "Foldable" is defined as "having a portion thereof which changes angle such that parts on either side of the portion with a changeable angle are brought closer or further away from each other." The portion which changes angle has a crease in some cases, a "crease" being an indented or thinner region adapted for being bent and returned to a pre-bent shape repeatedly. "Repeatedly" is defined as "at least 100 times without causing structural damage thereto. "Wider is defined as a direction which is perpendicular to a longest linear length of a material.

Pushing the cup holder towards the longest section (the longest section being between the fourth bend and the extreme end of the length of material which is at an end of the longest section) causes an angle of the first bend and one of the third bend and fourth bend to decrease. At the same time, the other of the third and fourth bend has an increased angle in embodiments of the disclosed technology.

The cup holder is adapted to be held on a top of a pocket (airplane, car, back of seat, and so forth) by way of insertion of the top of the pocket between the two substantially parallel sections of either side of the first bend. A "pocket" is defined as "a space between two pieces of fabric having a closed bottom and open top.

Any device or step to a method described in this disclosure can comprise or consist of that which it is a part of, or the parts which make up the device or step. The term "and/or" is inclusive of the items which it joins linguistically and each item by itself.

DETAILED DESCRIPTION OF EMBODIMENTS OF THE DISCLOSED TECHNOLOGY

A portable cup holder connected to a single continuous length of bendable material is disclosed herein. The cup holder is foldable flat and the single continuous length of material has a plurality of living hinges (series bends or is single crease allowing for bending/unbending repeatedly (at least 100 times) while still retaining the ability to bend and unbend). Likewise, the continuous length of bendable material has a plurality of living hinges allowing the device to fold flat onto itself or be stretched into a single length of material. The bends of the continuous length of material, when bent, can form a triangular region on which the cup holder is connected to one side. Over the triangular region, a further flange extends and then continues further down than the triangular region. The other end of the triangular region folds back on itself forming a flange under the portion thereof which continues further down than the triangular region.

In continuous length of material (which is separate from and fixedly connected to the cup holder) has five flat sides and four bends. The first and fourth bend are adjacent to each other in the folded condition and the triangular region is formed between the first, second, and third bends with the fourth bend meeting the first bend.

Embodiments of the disclosed technology will become more clear in view of the following discussion of the figures.

Figure 1:
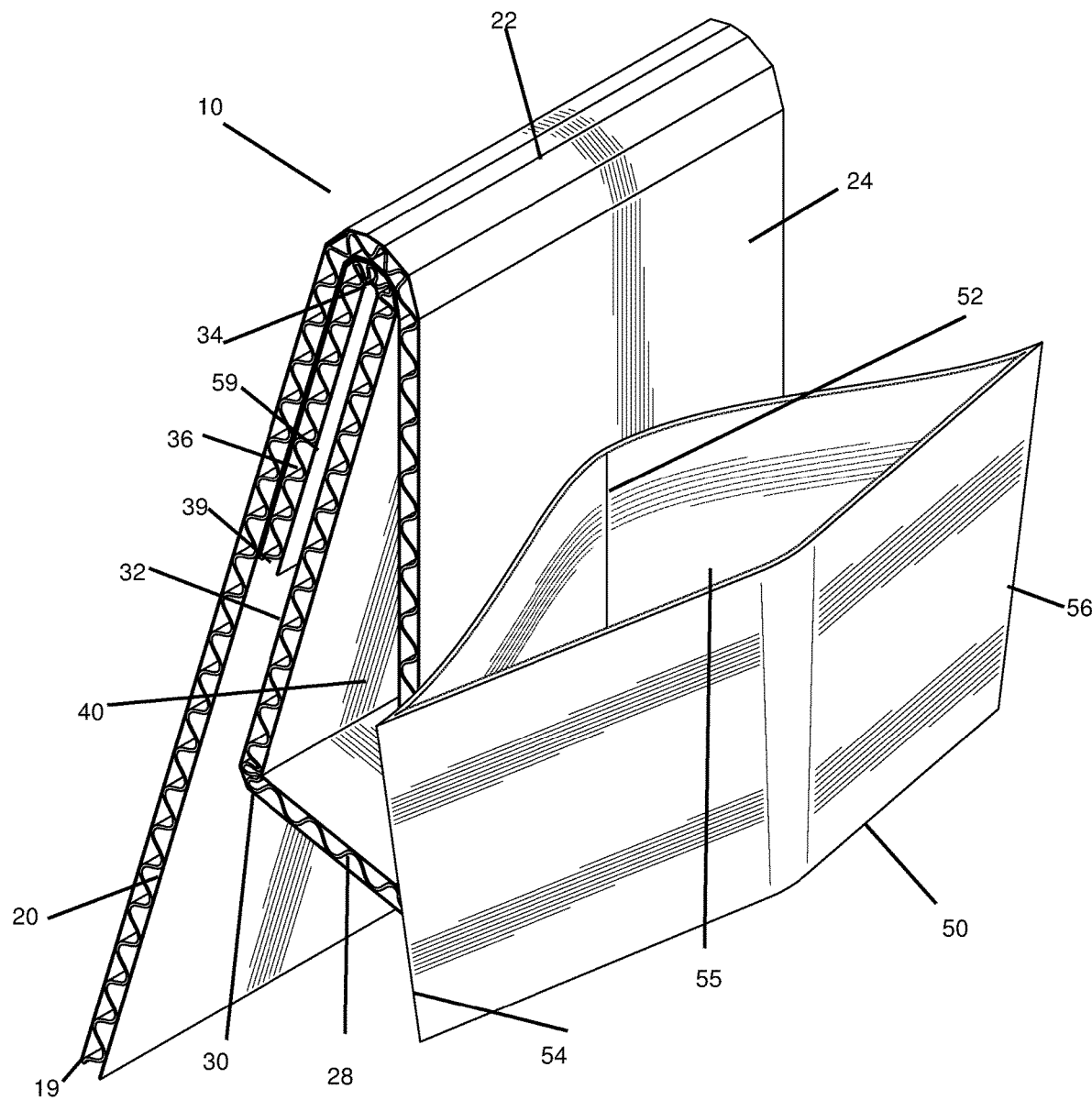
FIG. 1 is a perspective view of a portable cup holder of embodiments of the disclosed technology.
Figure 2:
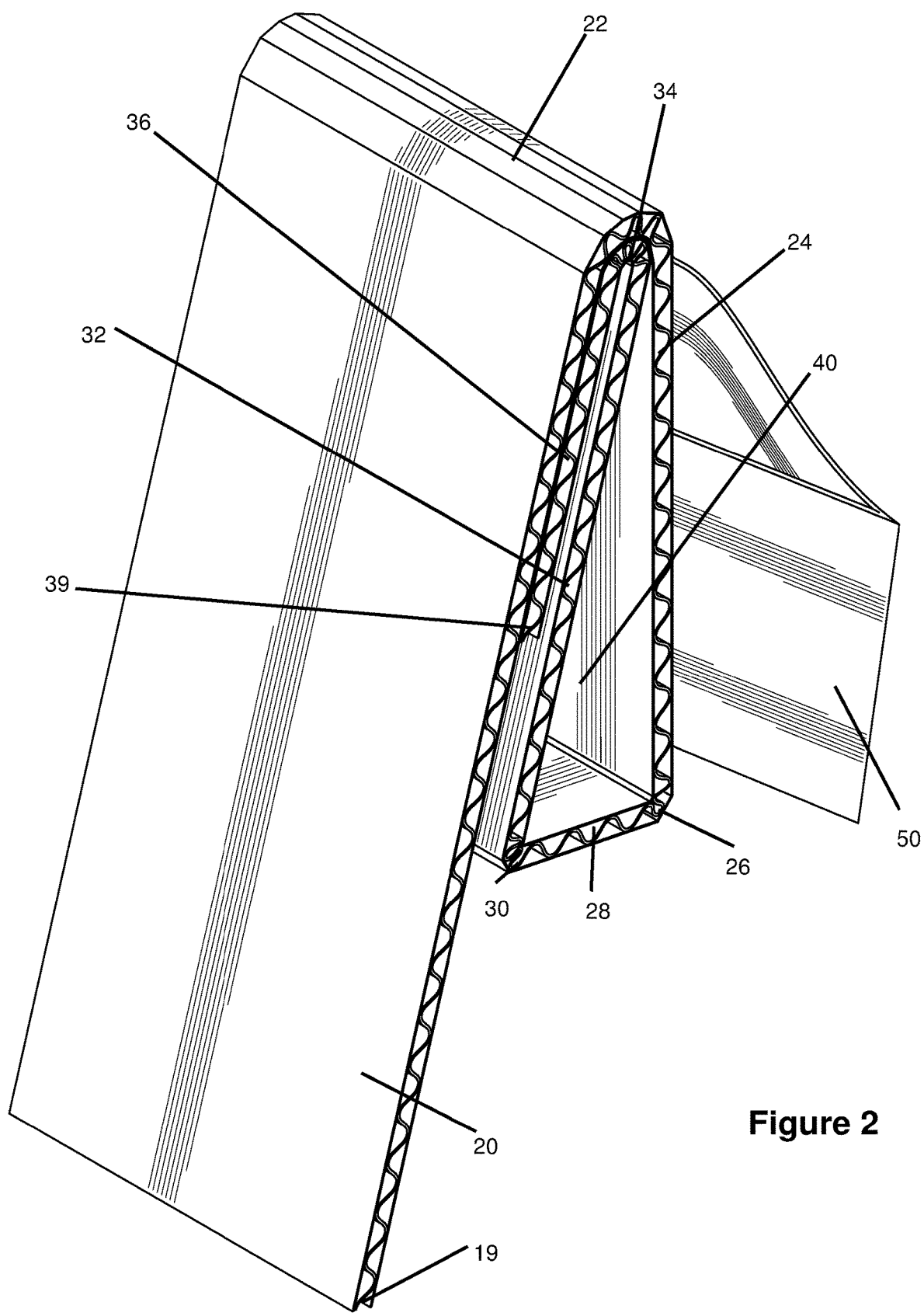
FIG. 2 is a reverse perspective view of the portable cup holder of FIG. 1.

Describing FIGS. 1 and 2 simultaneously, FIG. 1 is a perspective view of a portable cup holder of embodiments of the disclosed technology. FIG. 2 is a reverse perspective view of the portable cup holder of FIG. 1. A single length of continuous material extends from/to extreme ends 19 and 39. The extreme ends are the tips of the lateral sides, the lateral sides being the longest and generally flat sides of greatest area when unfolded flat. The extreme ends are also sides which join two lateral sides together.

A first extreme end 19 is at a tip of a longest flat side 20 of the material 10. The terms "longest", "shortest", and other terms describing length are relative to each other and refer to parts of the material 10 which are between creases or parts which are adapted to fold. The longest flat side 20 is terminated by the extreme end 19 and a first bend 22. The first bend 22, meanwhile, is a terminating side of a second flat side 24, the other end of the second flat side 24 terminated by an acutely angled bend 26. A horizontal side 28 ("horizontal" relative to a direction of a typical use of the device, used for convenience of understanding, and not by way of limitation) extends between the acutely angled bend 26 and a second acutely angled bend 30. The acutely angled bends, are described as such, based on their shape in one embodiment of the disclosed technology though these "acutely angled bends" can be unbent in various embodiments of the disclosed technology. Likewise, other descriptors are interpreted broadly and by way of example in the rest of the description herein.

The lateral side 24 and lateral side 20 are joined together at an acute angle which is the first bend 22 while additional lateral sides 32 and 36 are in parallel with each other and the first lateral side 20. The lateral side 32 is interior to the lateral side 36 when in the folded condition shown in FIGS. 1 and 2. That is, the lateral side 20 and lateral side 24 are folded over the lateral sides 32 and 36. The lateral sides 36 and 32 are continuous about a curved region (curved living hinge) 34 there-between. As such, a triangle, such as an isosceles triangle is substantially formed by the lateral and substantially equal sides lengths 24 and 32. A bottom shorter side of the triangle is formed by the horizontal portion 28 of the lateral material 10. As there are bends of the material 10 and the lengths are unconnected from each other, the "triangle" can be an exact mathematical triangle or what looks like a triangle to an ordinary observer in that there at least three acute angles, at least two of which are continuous with and between two lateral sides. Said another way, the "triangle" for purposes of this disclosure has at least three acutely angled sides relative to one another and at least one corner of the triangle abutting each other. Thus, a triangular portal 40 is formed within the material 10 surrounded by lateral sides 32, 28, and 24.

In the folded condition, the material 10 is folded over itself with a spaced apart rigidity between a front side 24 connected to a cup holder 50, and a back side 20 furthest away from the cup holder 50. The spaced apart aforedescribed rigidity is created by the triangular region surrounding the triangular portal 40 which, when the flat sides 20 and 24 are pushed towards each other during ordinary usage of the device (e.g. as a cup holder), the rigidity prevents the flat sides from substantially moving toward each other.

The top contoured angle 34 is opposite a bottom side 28 (also referred to previously as a "horizontal" side). An extreme end 39 is between the flat sides 20 and 32 in an embodiment of the disclosed technology. The extreme end 39 is joined with an end lateral region 32 which forms a folded section which enables or better holds the folded parts, including the triangular region, in place than compared to without this portion of the material 10. The lateral region 36 can be of substantially any reasonable length so long as the angle 34 is able to remain during regular use of the cup holder therewith. In some embodiments, the length 20 is longest of the flat portions of the material 10 (when the materials are in the folded condition).

In some embodiments, the angles 30 and 26 are sharp angles (turning from one angle to another angle at a what an ordinary observer would consider a single line in space or such that the lateral portions extend in one direction and then another direction lacking many angled parts changing direction slowly between the angles of each lateral portion). In some embodiments, the angles 22 and 34 are curved angles which lack abrupt bends and/or more slowly change angle than the sharp angles 30 and 26. The angle 22 is more obtuse or changes angle more slowly per linear distance compared to the angle 34 such that the portion of the material 10 which forms the angle 22 is over the portion of the material 10 which forms the angle 34. The portions which form the angles 22 and 34 can also be one over another, in contact therewith each other.

Figure 11:
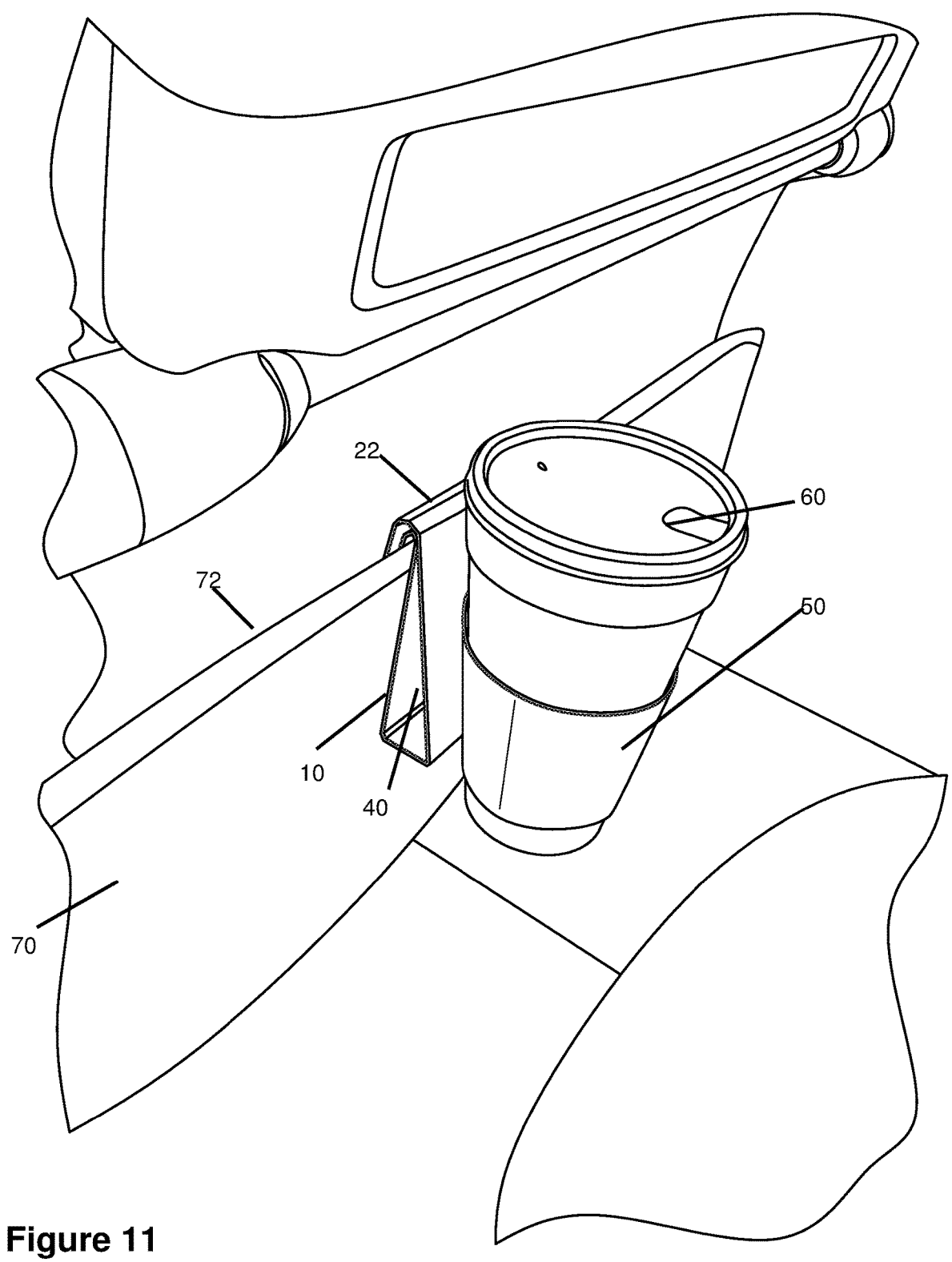
FIG. 11 shows the portable cup holder of FIG. 1 attached to a pocket of a seat in an embodiment of the disclosed technology.

Discussing now FIGS. 1 and 2 simultaneously with FIG. 11, FIG. 11 shows the portable cup holder of FIG. 1 attached to a pocket of a seat in an embodiment of the disclosed technology. A pocket attachment region, which is a slot 59, is also formed between the lateral region 36 and either the lateral region 32. The slot 59 is open to a bottom side and closed at some sides (the lateral sides) and a top thereof in embodiments of the disclosed technology. In such cases, the angled region 22 and 34, respectively, form a top most attachment region. Such a pocket has an upper lip or upper end 72 and front face 70 forming a side of the pocket. A cup 60 can be placed into the cup holder 50 by expanding the foldable cup holder region into a generally circular shape. Any device described herein can be exactly as described or generally as described, "generally" being "what a neurotypical person would consider to be so even if different than a strict mathematical definition thereof."

As one can see in FIG. 11, the material 10 keeps the cup spaced from the pocket by way of the triangular portal 40 while the material is held by the pocket 70 with the pocket between the lateral side 20 and one of side 36. In this manner, the cup 60 is held in place relative to a pocket such as a pocket on a back side of a seat of a plane, car, or pants (presumably, when carrying candy in a cup rather than hot coffee).

Referring now to the cup holder 50 itself, the cup holder is flat foldable such that a front side (opposite rear side 42) and rear side 52 are substantially or generally flat and/or parallel to each other. Folds or sides 54 and 56 join the front and back sides together and are at 180 degree angles when the cup holder is folded flat. At a center line of the back side 52, the cup holder 50 is attached along a vertical axis or otherwise to the front flange 24. The cup holder, when folded flat, is wider than the width the material 10. The width of the material 10 is perpendicular to it's length, the width being shorter than the length of the material when the material is in an unfolded condition.

Figure 5:
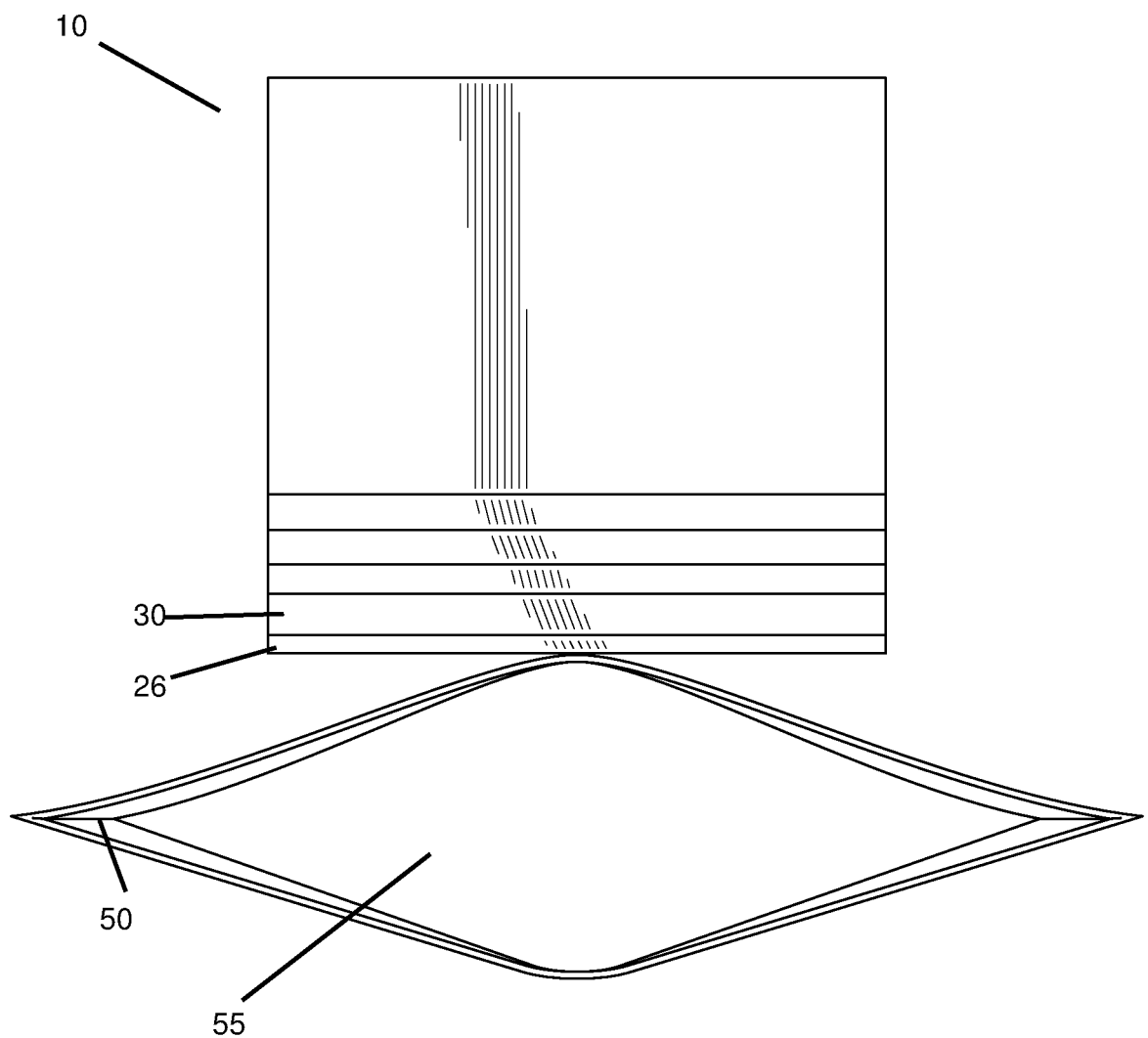
FIG. 5 is a bottom plan view of the portable cup holder of FIG. 1.
Figure 6:
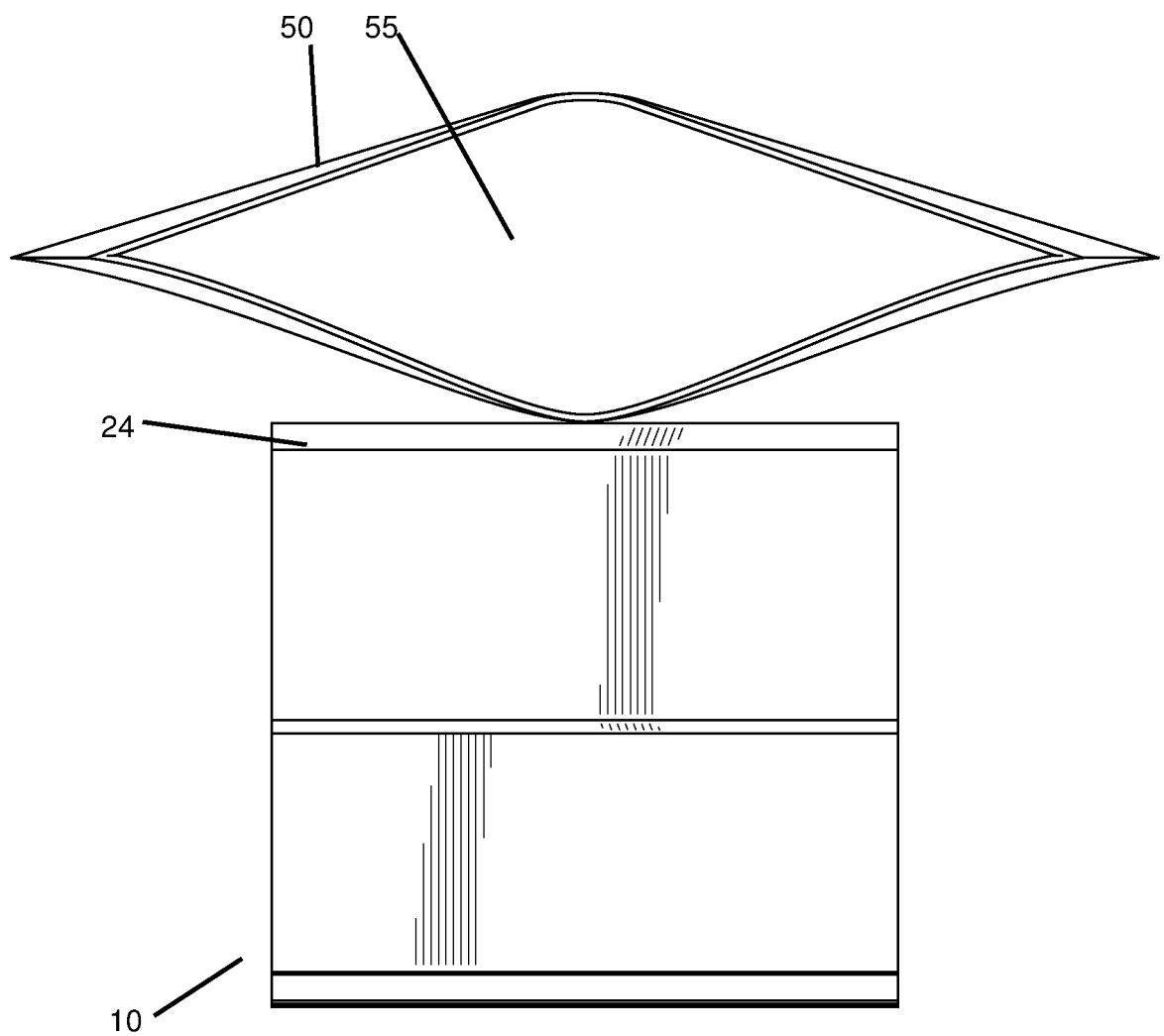
FIG. 6 is a top plan view of the portable cup holder of FIG. 1.

As seen in FIGS. 5 and 6, the cup holder has a portal 55 extending from top to bottom. FIG. 5 is a bottom plan view of the portable cup holder of FIG. 1. FIG. 6 is a top plan view of the portable cup holder of FIG. 1.

Figure 3:
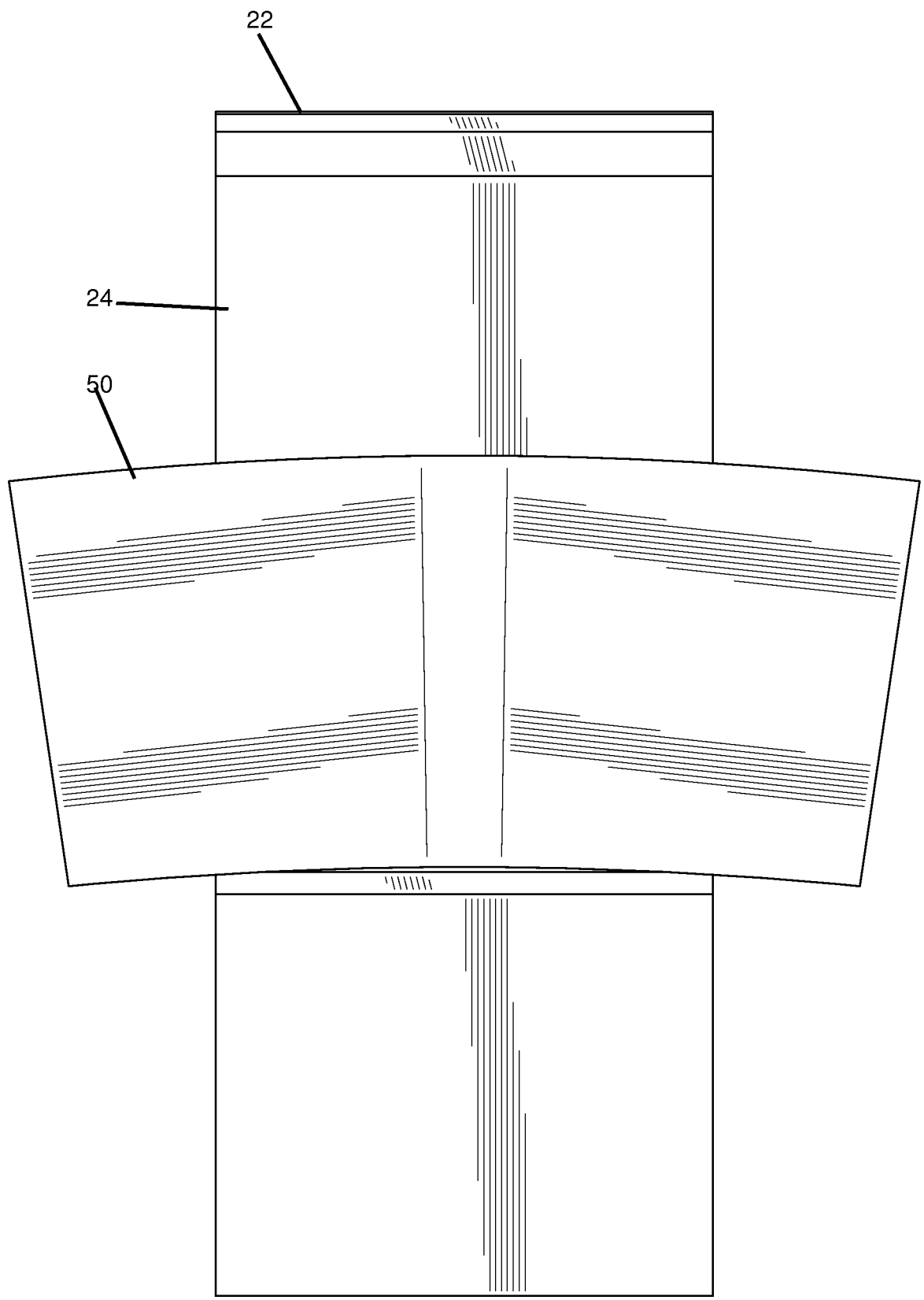
FIG. 3 is a front elevation view of the portable cup holder of FIG. 1.
Figure 4:
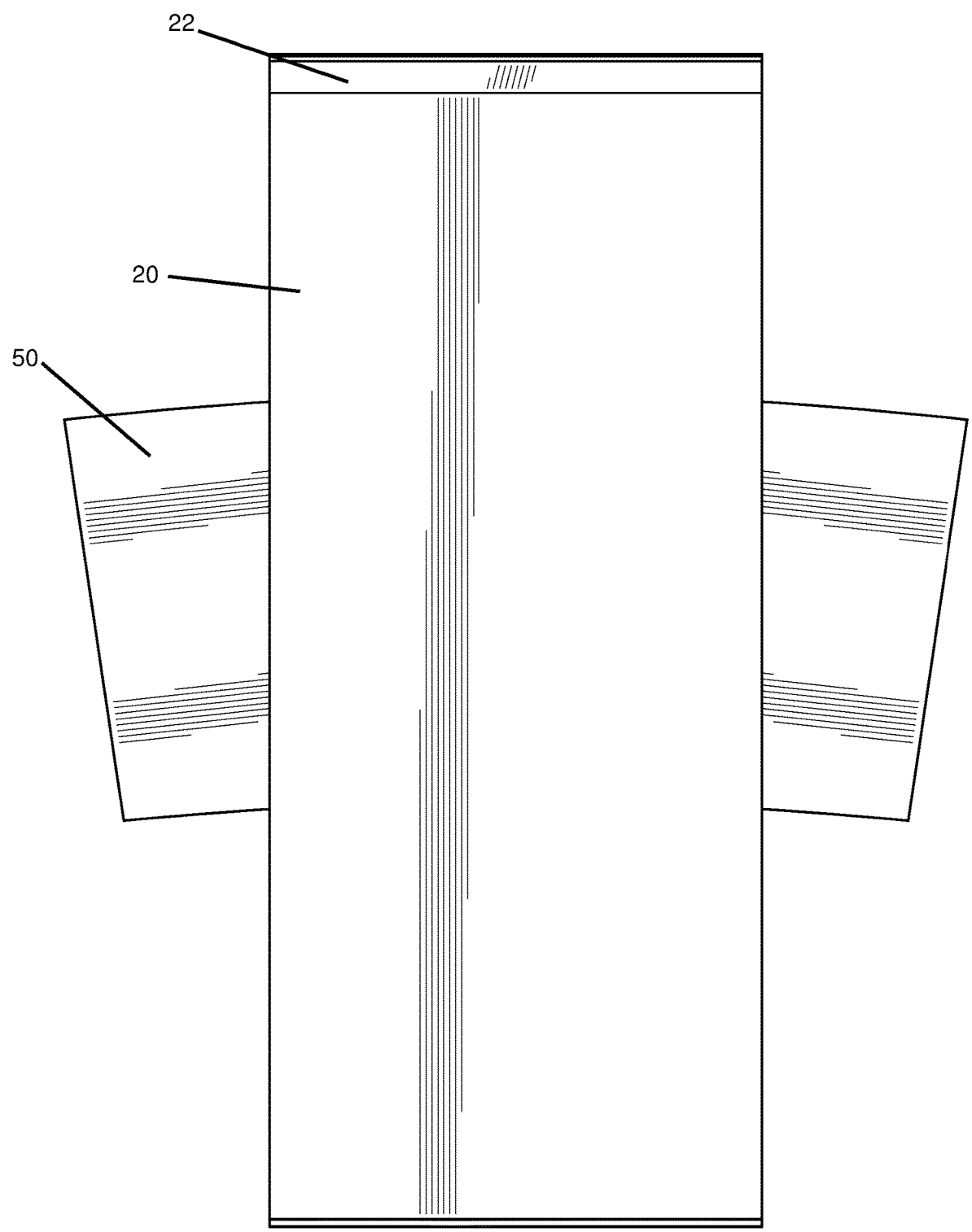
FIG. 4 is a rear elevation view of the portable cup holder of FIG. 1.

FIG. 3 is a front elevation view of the portable cup holder of FIG. 1. FIG. 4 is a rear elevation view of the portable cup holder of FIG. 1. Here, one can see the width of the cup holder 50 is wider than the width of the material 10 and the cup holder 50 is attached to the front side 24 of the material 10. When the cup holder is made into a circular or elliptical configuration/unfolded the cup holder can be narrower or wider than the material 10 depending on the embodiment.

Figure 7:
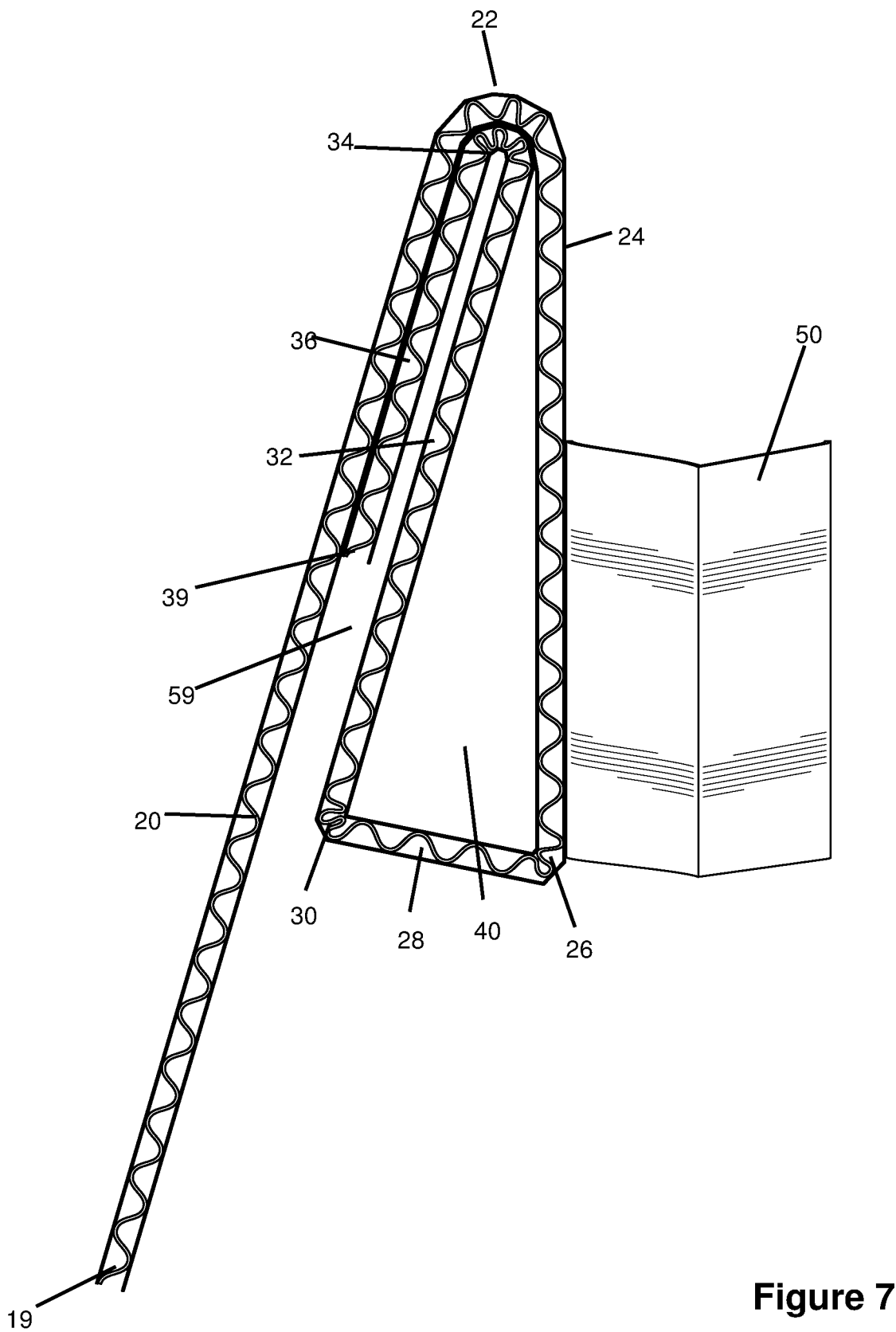
FIG. 7 is a side elevation view of the portable cup holder of FIG. 1, the reverse side being a mirror image thereof.

FIG. 7 is a side elevation view of the portable cup holder of FIG. 1, the reverse side being a mirror image thereof. The first lateral side 20 is bent around a less acute bend 22 which joins with a second lateral side 24. This second lateral side is then bent at a sharp bend 26 to a third lateral side 28 which is a shortest side in some embodiments of the disclosed technology. This shortest side extends to a second sharp and acute bend 30 which joins to a fourth lateral side 32. The fourth lateral side 32 then extends to a more acute bend 34 (compared to the less acute bend 22). The acute bend 22 is curved over the acute bend 34 in embodiments of the disclosed technology. A fifth lateral region 36 of the material 10 extends from the more acute bend 34 to an extreme end 39 of the material 10. In order of length, in some embodiments of the disclosed technology, the length 20 is longest, length 24 is second longest, length 32 is third longest, length 32 is fourth longest, and length 28 is shortest of the material 10.

Figure 8:
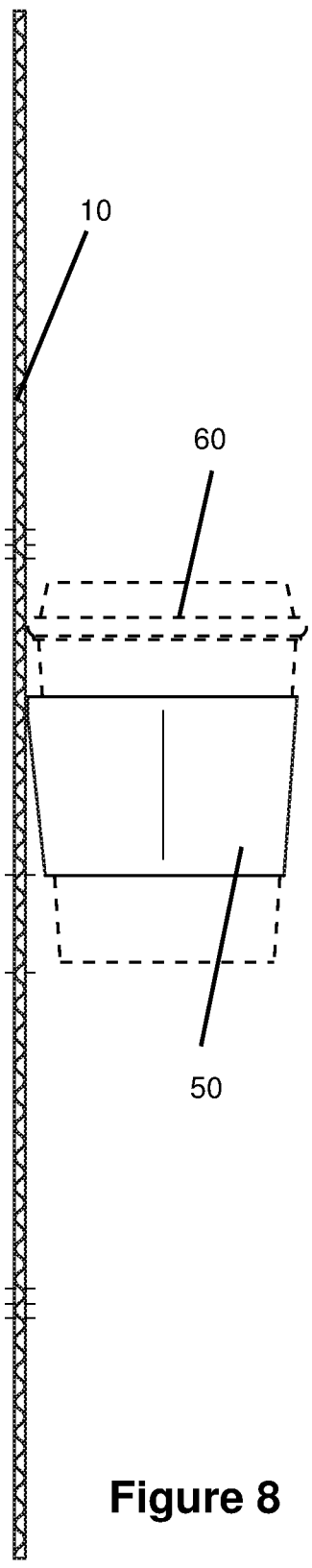
FIG. 8 is a side elevation view of a flattened version of the portable cup holder of FIG. 1 with a cup in the cup holder portion.
Figure 9:
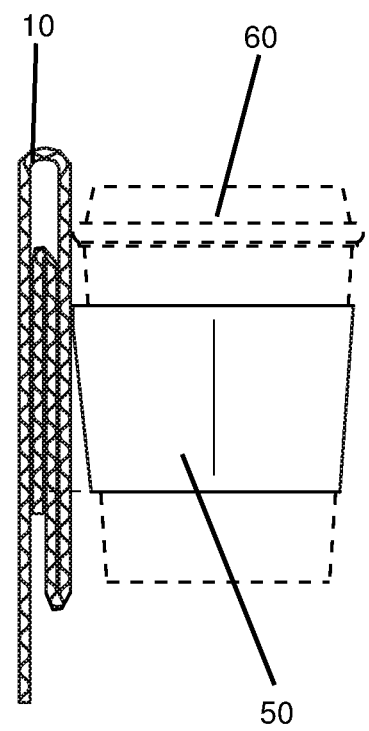
FIG. 9 is a side elevation view of the portable cup holder of FIG. 1 with a cup in the cup holder portion.

FIG. 8 is a side elevation view of a flattened version of the portable cup holder of FIG. 1 with a cup in the cup holder portion. FIG. 9 is a side elevation view of the portable cup holder of FIG. 1 with a cup in the cup holder portion. The cup 60 is held within the cup holder 50, the cup holder 50 being fixedly attached (designed to remain attached throughout usage of the device during normal usage, e.g. as a cup holder) to the length of material 10. The length of material 10 can be unfolded into a single linear length (each cardinal side substantially lying in the same plane as considered to be by an ordinary observer). The creases and bends, however, may remain. In the folded condition, as shown in FIG. 9, has the length of material 10 folded over itself forming four layers. When fully compressed, the four layers are pressed against a lateral side of an adjacent layer as shown.

Figure 10:
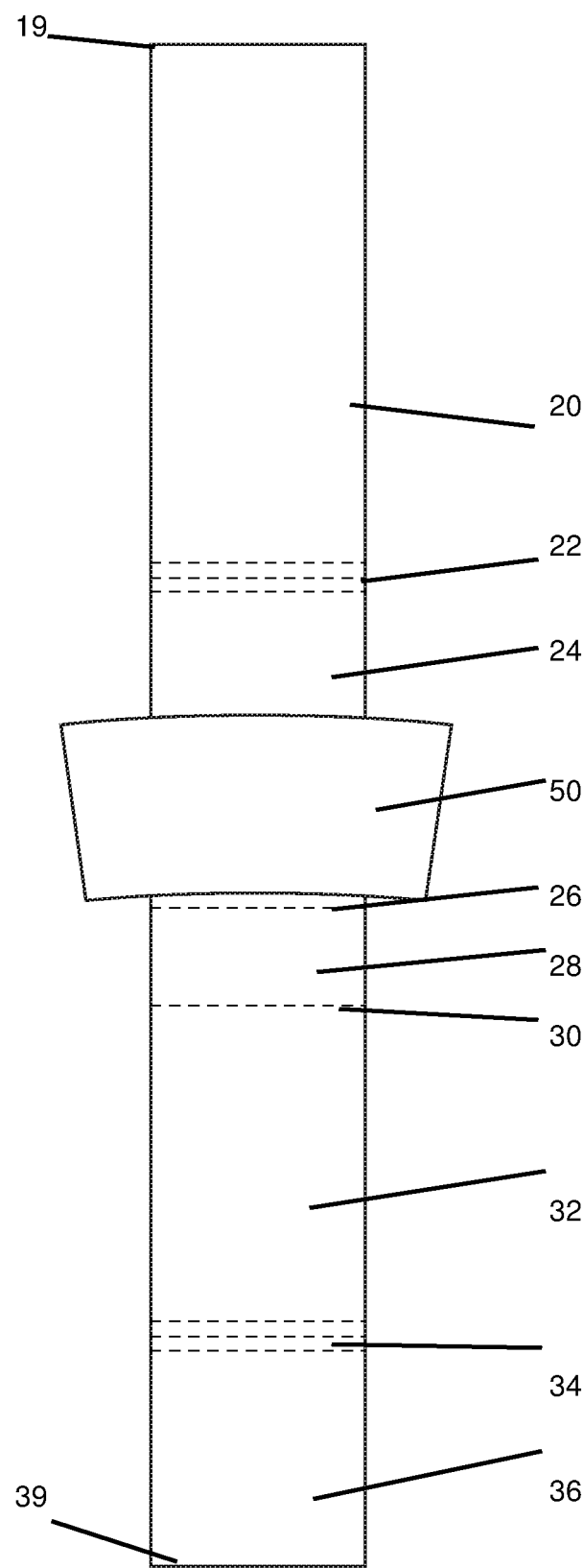
FIG. 10 shows an unfolded version of the portable cup holder of FIG. 1.

FIG. 10 shows an unfolded version of the portable cup holder of FIG. 1. From a first extreme end 19 to a second extreme end 39, the linear length of material 10 has distinct linear regions terminated by one or more of an extreme end, crease (which forms a sharp acute angle when folded), and/or a living hinge (multiple creases in close proximity allowing a series of less acute bends which form a single greater acute bends). A first linear region 20 is between the extreme end 19 and a living hinge 22. A second linear region 24 is between the living hinge 22 and crease 26. The cup holder 50 is fixedly attached to the second linear region 24 and extends perpendicular in two planes relative to the longest linear direction of the front side of the second linear region 24. A third linear length of material 28 extends between acute bends 26 and 30. A fourth linear length 32 extends between the crease 30 and living hinge 34. A final linear length of material 36 extends between the living hinge 34 and an extreme end 39. The length of material 10 can then be folded into the configuration shown in FIGS. 1 and 7.

For purposes of this disclosure, the term "substantially" is defined as "at least 95% of" the term which it modifies.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A portable cup holder, comprising:
   a holder comprised of a plurality of circular cross sections;
   a single length of bendable material including a middle linear region fixedly and tangentially connected to said plurality of circular cross sections;
   wherein said single length of bendable material is bent such that an upper portion above a first linear region is bent over a lower portion below said middle linear region;
   wherein said lower portion comprises a bottom linear region terminating at two bends:
   a first bend at a first end which is continuous with said middle linear region;
   a second bend at an opposite end from said first bend;
   wherein said lower portion further comprises an interior section comprising two sections substantially parallel to each other with a bend between said two sections, a longer section of said two sections continuous with said second bend of said bottom linear region and a short section of said two sections disposed further from said holder than said longer section.

2. The portable cup holder of claim 1, wherein said plurality of circular cross sections are of decreasing circumference, from said upper portion to said lower portion.

3. The portable cup holder of claim 1, wherein said upper portion comprises a single curvilinear bend being continuous with said middle linear region.

4. The portable cup holder of claim 3, wherein said upper portion extends to a highest and lowest extent of said portable cup holder.

5. A portable cup holder, comprising:
   a holder comprised of a plurality of circular cross sections;
   a single length of bendable material including a middle linear region fixedly and tangentially connected to said plurality of circular cross sections;
   wherein said single length of bendable material is bent such that an upper portion above a first linear region is bent over a lower portion below said middle linear region;
   wherein said bendable material is folded over itself three times forming:
   a substantially triangular inner region with a first side being said middle linear region, a second side between said middle linear region and a third side continuous and bent relative to the second side.

6. The portable cup holder of claim 5, wherein said substantially triangular inner region is an isosceles triangle.

7. The portable cup holder of claim 6, wherein a slot is formed between said third side of said triangle and a linear section at an extreme end of said single length of bendable material which is connected to said third side of said triangle, divided from said third side of said triangle by a bend in said single length of bendable material.

8. The portable cup holder of claim 7, wherein said portal cup holder is adapted to attached to a seat pocket by placing a top end of said seat pocket in said slot.

9. A foldable cup holder with a length of material having exactly four bends, further comprising:
   two substantially parallel sections on either side of a first bend;
   a triangular section between said first bend and a fourth bend, comprising a second and third bend;
   a longest section between said fourth bend and an end of said length of material; and
   a foldable conical section with a top and bottom side opening which are substantially in parallel with a section of said foldable cup holder that is between said third bend and said fourth bend;
   wherein said first, second, third, and fourth bends are in order along said length of material;
   wherein said cup holder is adapted to be held on a top of a pocket by way of insertion of said top of said pocket between said two substantially parallel sections of either side of said first bend.

10. The foldable cup holder of claim 9, wherein unbending said third bend causes said device to be more flattenable between said end of said longest section and said foldable conical section.

11. The foldable cup holder of claim 10, where said foldable conical section is flattenable and in a flattened condition thereof said foldable conical section is wider than said length of material, wherein wider is defined as a direction which is perpendicular to a longest linear length of said length of material.

12. The foldable cup holder of claim 11, wherein pushing said cup holder towards said longest section between said fourth bend and said end of said length of said material causes an angle of said first bend and one of said third bend and said fourth bend to decrease.

13. The foldable cup holder of claim 12, wherein pushing said cup holder towards said longest section causes another of said angle of said third bend and said fourth bend to increase.

14. A cup holder with a four layered section, comprising, in order:
   a first longest layer at a first extreme end of a length of material;
   a second layer at a second extreme end of said length of material, said second extreme end at an opposite end relative said first extreme end;
   a third layer in parallel with said first and second layer;
   a fourth layer fixedly attached to a cup holder;
   wherein said interior space and said bottom side are substantially unformed when said first longest layer and said cup holder are pushed towards each other.

15. The cup holder with a four layered section of claim 14, wherein an interior space is formable between said third and fourth layers causing a bottom side between said third and fourth sides to be perpendicular to a longest length of said first longest layer.

16. The cup holder of claim 15, wherein when said longest layer and said cup holder are pushed towards each other, said first longest layer and said fourth layer become closer to parallel compared to a condition before said pushing.

\* \* \* \* \*